(12) United States Patent
Olsen (10) Patent No.: US 11,976,632 B2
(45) Date of Patent: May 7, 2024

(54) MASS DAMPER MODULE FOR WIND TURBINE INSTALLATION

(71) Applicant: Vestas Wind Systems A/S, Aarhus N (DK)

(72) Inventor: Anders Olsen, Grenaa (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/004,133

(22) PCT Filed: Jul. 8, 2021

(86) PCT No.: PCT/DK2021/050229
§ 371 (c)(1),
(2) Date: Jan. 3, 2023

(87) PCT Pub. No.: WO2022/008020
PCT Pub. Date: Jan. 13, 2022

(65) Prior Publication Data
US 2023/0193876 A1   Jun. 22, 2023

(30) Foreign Application Priority Data
Jul. 9, 2020   (EP) .................................... 20184945

(51) Int. Cl.
*F03D 7/02*    (2006.01)
*F03D 13/10*   (2016.01)
*F03D 80/80*   (2016.01)

(52) U.S. Cl.
CPC ........... *F03D 7/0296* (2013.01); *F03D 13/10* (2016.05); *F03D 80/82* (2016.05);
(Continued)

(58) Field of Classification Search
CPC ........ F03D 13/10; F03D 13/20; F03D 7/0296; E04H 9/0215; B66C 1/108; B66C 23/185
See application file for complete search history.

(56) References Cited

U.S. PATENT DOCUMENTS 9,896,310 B2 * 2/2018 Seidel ....................... F16F 7/10
10,837,425 B2 * 11/2020 Jiang ..................... F03D 1/0658
(Continued)

FOREIGN PATENT DOCUMENTS

CN         202040268 U    11/2011
EP         1008747 A2      6/2000
(Continued)

OTHER PUBLICATIONS

International Searching Authority, International Search Report and Written Opinion issued in PCT Application No. PCT/DK2021/050229, mailed Oct. 1, 2021.
(Continued)

*Primary Examiner* — Justin D Seabe
(74) *Attorney, Agent, or Firm* — Wood Herron & Evans LLP (57) ABSTRACT

A mass damper module (600) for a wind turbine installation comprises: an attachment interface (603*a-d*) adapted to removably attach the mass damper module to structural lifting parts (303*a-d*) of a nacelle (300) of the wind turbine installation; and an active tuned mass damper (601) controllable to damp vibration of the wind turbine installation when the mass damper module is so attached to the nacelle and the nacelle is attached to a tower (200) to form the wind turbine installation.

16 Claims, 5 Drawing Sheets

(52) U.S. Cl.
CPC ..... *F05B 2230/61* (2013.01); *F05B 2260/964* (2013.01); *F05B 2270/404* (2013.01)

(56) References Cited

U.S. PATENT DOCUMENTS

| | | | |
|---|---|---|---|
| 11,118,646 B2* | 9/2021 | Jiang | F03D 13/25 |
| 2008/0145222 A1 | 6/2008 | Schellings | |
| 2013/0280064 A1* | 10/2013 | van Steinvoren | F03D 13/35 |
| | | | 416/1 |
| 2020/0122981 A1* | 4/2020 | Mastrup | B66C 13/063 |
| 2022/0289526 A1* | 9/2022 | Stempinski | F03D 13/25 |

FOREIGN PATENT DOCUMENTS

| | | | | |
|---|---|---|---|---|
| JP | 2012201219 A | * | 10/2012 | |
| WO | WO-2017204371 A1 | * | 11/2017 | ............. F03D 13/25 |
| WO | 2019091021 A1 | | 5/2019 | |
| WO | 2019201471 A1 | | 10/2019 | |

OTHER PUBLICATIONS

European Patent Office, Extended European Search Report issued in EP Application No. 20184945.2, mailed Jan. 12, 2021.

* cited by examiner

MASS DAMPER MODULE FOR WIND TURBINE INSTALLATION

FIELD OF THE INVENTION

The present invention relates to a mass damper module for a wind turbine installation, for example an offshore or onshore wind turbine installation.

BACKGROUND

A typical wind turbine includes a tower, a nacelle located on the tower and containing a generator connected to a drive hub by a shaft, and rotor blades attached to the drive hub. To install the wind turbine onsite, the base of the tower is fixed in the ground. For an offshore wind turbine the foundation will be in the seabed or on a floating foundation moored to the seabed. The nacelle is then lifted by crane for attachment to the top of the tower. Once the nacelle has been secured to the tower, the rotor blades are manoeuvred into place by the crane for attachment to the drive hub.

The assembled wind turbine is a tall, heavy structure that is carefully designed for dynamic stability in strong winds. On the other hand, the partly completed wind turbine installation, comprising just the tower and the nacelle without the rotor blades, is a top-heavy, static structure that is susceptible to disturbance by wind loads. In the case of an offshore wind turbine, the structure is additionally subject to forces from water waves. These wind and wave forces can cause the tower to oscillate such as to produce considerable lateral motion, i.e. swaying, of the nacelle and the upper part of the tower. For example, the tower may bend under the forces to such an extent that the nacelle is displaced laterally from the base of the tower by as much as two metres. This oscillation of the nacelle causes difficulty in the installation of the rotor blades to the drive hub. The present invention aims to alleviate this problem to at least some extent.

SUMMARY OF THE INVENTION

According to an aspect of the invention, there is provided a mass damper module for a wind turbine installation, comprising: an attachment interface adapted to removably attach the mass damper module to structural lifting parts of a nacelle of the wind turbine installation; and an active tuned mass damper controllable to damp vibration of the wind turbine installation when the mass damper module is so attached to the nacelle and the nacelle is attached to a tower to form the wind turbine installation.

The mass damper module can be attached to the nacelle in order to provide damping of vibration of the nacelle and tower due to wind and wave forces. In this way the structure is stabilised so as to enable rotor blades to be attached to the wind turbine. After installation of the rotor blades, the mass damper module may be removed from the nacelle and, if desired, re-used in another wind turbine installation.

The mass damper module conveniently attaches to existing structural lifting parts of the nacelle, and is therefore compatible with the nacelle without any need for structural modification of the nacelle. Furthermore the mass damper module may be configured to accommodate a range of active tuned mass dampers having differing size and mass, such that the mass damper module may be used with a range of wind turbine installations of differing size. For these reasons, the mass damper module is a cost-effective solution to the problem of vibration of the wind turbine structure during rotor blade installation.

As used herein, the terms "oscillation" and "vibration" have the same meaning and are interchangeable.

The mass of the active tuned mass damper may be controllable to be moved in a plane substantially perpendicular to a longitudinal axis of the tower in order to damp said vibration.

The mass may be selectively controllable to be moved in the plane in a first direction and a second direction substantially perpendicular to the first direction.

The mass may be controllable to be moved in the plane so as to have a component of movement in the first direction and a component of movement in the second direction.

The attachment interface may be further adapted to attach the mass damper module to the structural lifting parts of the nacelle so as to place the mass damper module in fixed relationship with the nacelle in order to prohibit relative movement between the mass damper module and the nacelle in any direction.

The attachment of the mass damper module to the structural lifting parts of the nacelle may be for mounting the mass damper module externally of the nacelle, preferably on an external surface of the nacelle, such as an upper external surface of the nacelle. An interface of the attachment may be internally or externally relatively to a boundary of the nacelle, but e.g. a moveable mass of the mass damper module will be external to the boundary.

The mass damper module may comprise at least one structural lifting part for lifting the mass damper module.

The mass damper module may comprise a controller configured for said control of the active tuned mass damper.

The mass damper module may comprise an electrical interface for connection to an external electrical power source for powering the active tuned mass damper.

The mass damper module may comprise an energy storage device, for example a battery, for powering the active tuned mass damper.

According to another aspect of the invention, there is provided a wind turbine assembly, comprising: a nacelle attached to a tower to form a wind turbine installation; and a mass damper module mounted to the nacelle, wherein the mass damper module comprises: an attachment interface removably attached to structural lifting parts of the nacelle; and an active tuned mass damper controllable to damp vibration of the wind turbine installation.

According to another aspect of the invention, there is provided a method of assembling a wind turbine, the method comprising: attaching a mass damper module as described herein above to a nacelle and attaching the nacelle to a tower to form a wind turbine installation, or attaching a nacelle to a tower to form a wind turbine installation and attaching a mass damper module as described herein above to the nacelle; controlling the active tuned mass damper to damp vibration of the wind turbine installation; and attaching rotor blades to the wind turbine installation.

The method of assembling a wind turbine may comprise removing the mass damper module from the nacelle after attaching the rotor blades.

BRIEF DESCRIPTION OF THE DRAWINGS

Embodiments will now be described, by way of example, with reference to the accompanying figures in which.

DETAILED DESCRIPTION

Figure 1:
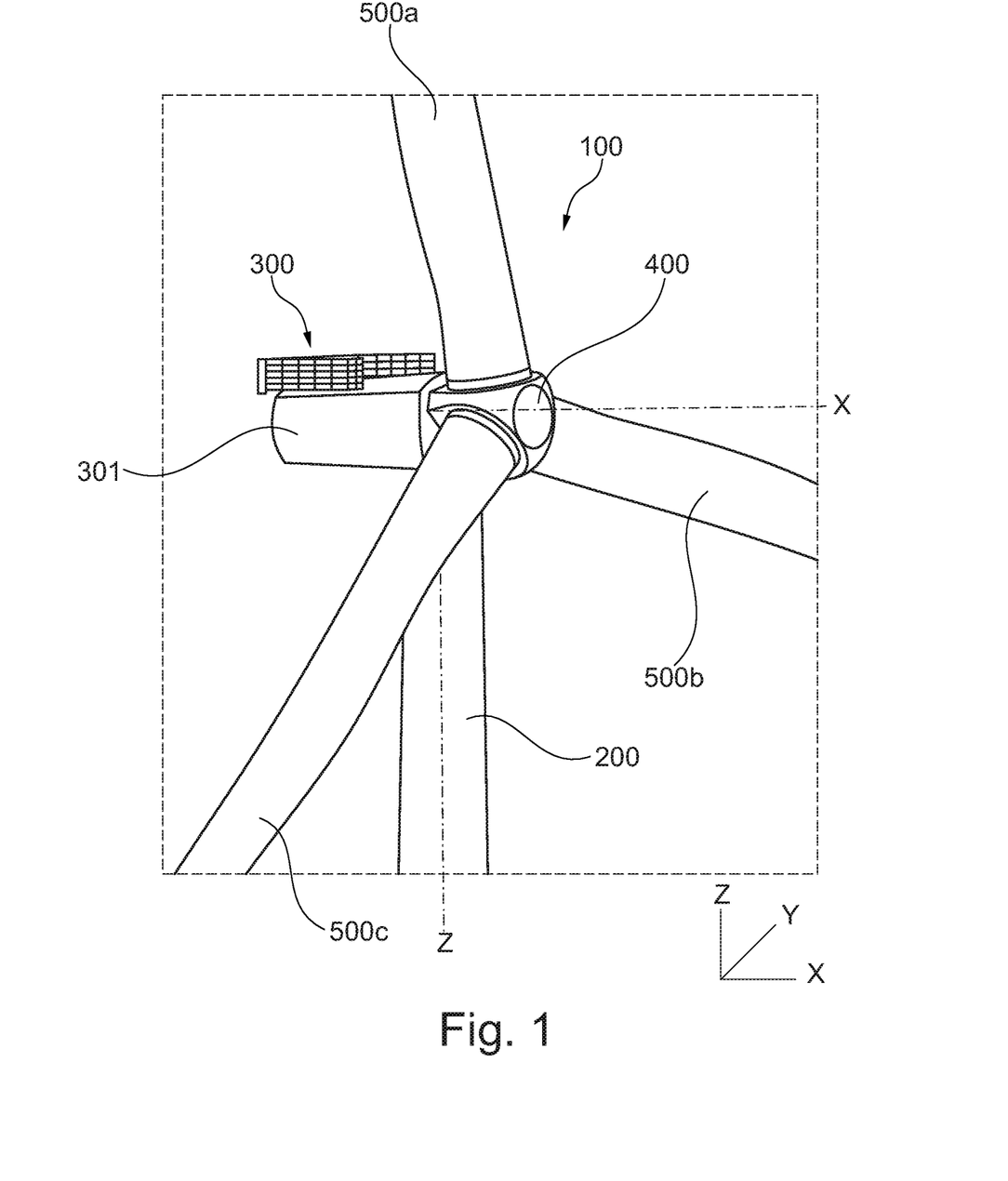
FIG. 1 shows a wind turbine including a nacelle mounted on a tower.

Referring to FIG. 1, an exemplary offshore wind turbine 100 comprises a tower 200 (having a mass of around 200-500 tonnes), a nacelle 300 (around 300-500 tonnes), a rotor hub 400, and a plurality of rotor blades 500a-c.

The tower 200 comprises a tubular structure having a longitudinal (or vertical) axis Z. A lower end of the tower 200 (not shown) is fixed in the seabed. The nacelle 300 is rigidly attached to an upper end of the tower 200. The nacelle 300 comprises a housing 301 containing a generator (not shown). The rotor hub 400 extends from the nacelle 300 and is connected to the generator by a horizontally arranged shaft (not shown) having an axis X that is substantially perpendicular to the longitudinal axis Z of the tower 200. The rotor blades 500a-c are attached to the rotor hub 400. In use of the wind turbine 100, a wind force acting on the rotor blades 500a-c causes the rotor blades 500a-c to rotate about the horizontal axis X, thereby to drive the generator via the shaft to produce electrical energy.

Figure 2:
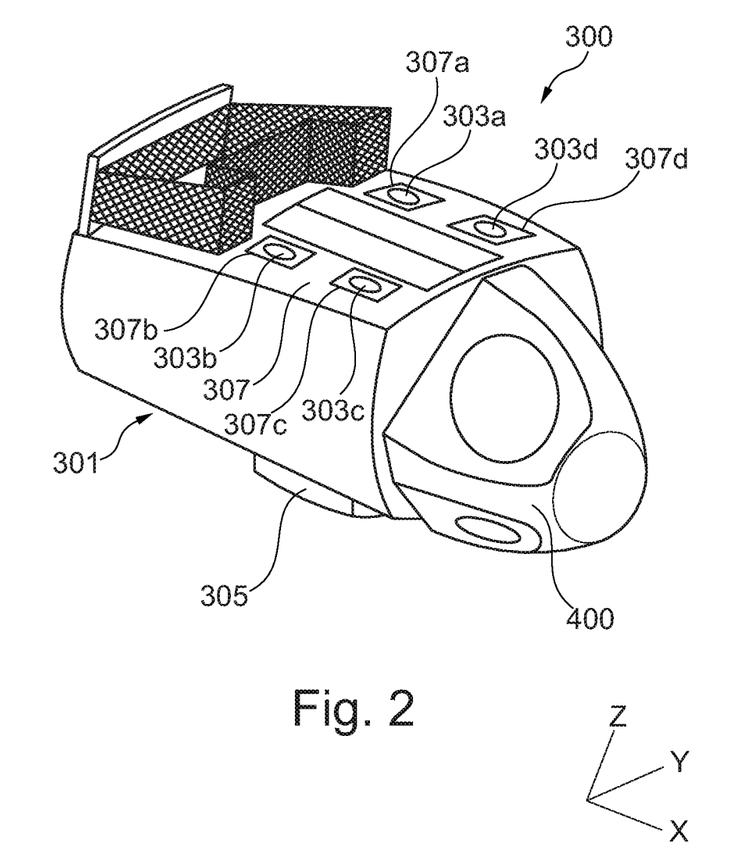
FIG. 2 shows the nacelle in greater detail.

Referring next to FIG. 2, the housing 301 of the nacelle 300 comprises a plurality of panels that together form the exterior surfaces of the nacelle 300. The panels are attached to a structural frame 303 (partly shown) of the nacelle 300 that also supports the rotor hub 400 and the generator, along with other components of the energy production system. In this exemplary nacelle 300, the structural frame 303 is a tubular construction. A flange part 305 of the nacelle 300 is configured for attachment to a complementary flange part of the upper end of the tower 200, as will be described later herein.

An upper surface 307 of the nacelle 300 comprises a plurality of apertures or openings, which openings allow access to lifting or hoisting parts, or points, or portions, of the structural frame 303 located within the housing 301. In this exemplary nacelle 300 the structural frame 303 comprises four lifting parts 303a-d and the upper surface 307 comprises four respective apertures 307a-d. In this exemplary nacelle 300, the structural frame 303 and the lifting parts 303a-d thereof comprise steel. The lifting parts 303a-d are configured with adequate strength to support the entire weight of the nacelle 300 as the nacelle 300 is lifted onto the tower 200 during installation, as will be described later herein. In this exemplary nacelle 300, the structural frame 303 and the lifting parts 303a-d thereof comprise steel.

Figure 3:
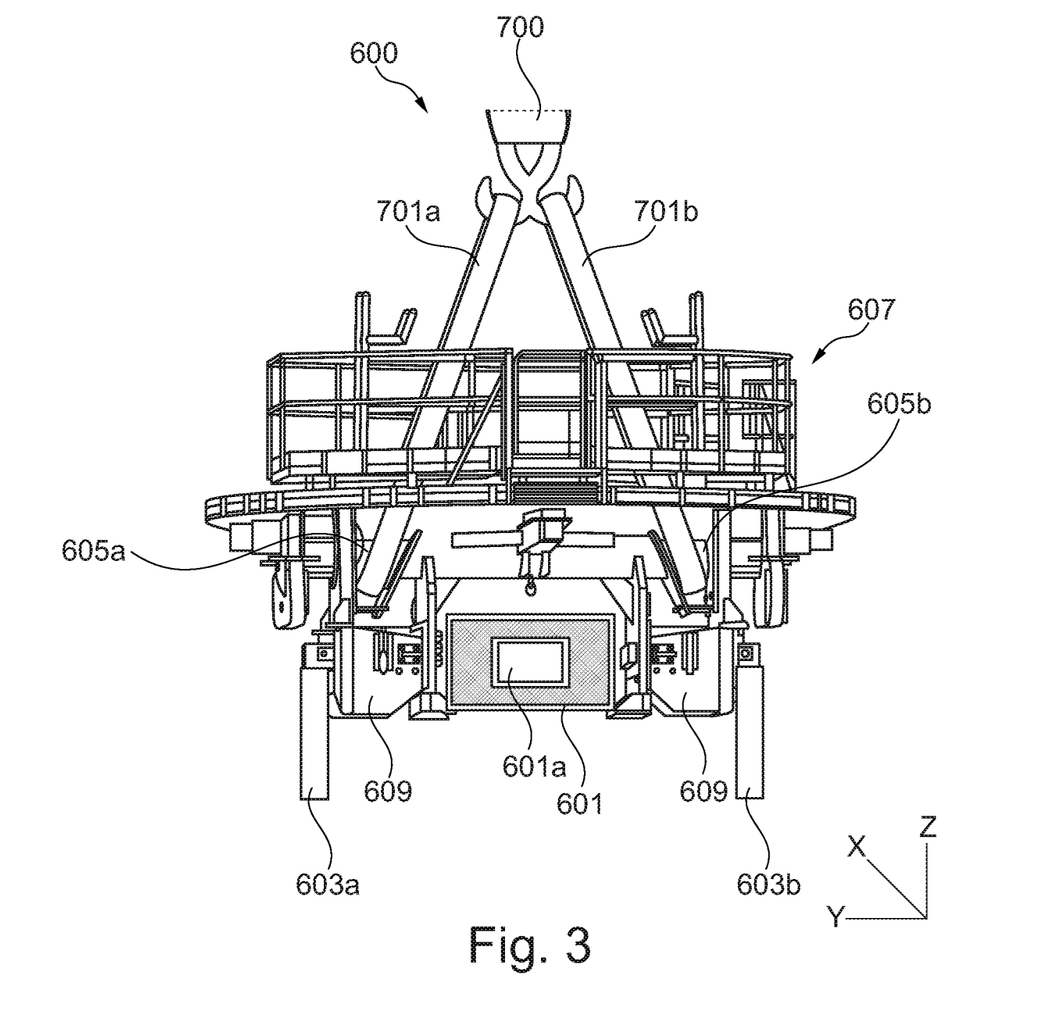
FIG. 3 shows an example of a mass damper module according to the invention.

Turning now to FIG. 3, a mass damper module 600 comprises an active tuned mass damper 601 and an attachment interface for attaching or connecting, or coupling the mass damper module 600 to the nacelle 300. In this example, the attachment interface comprises four downwardly projecting legs 603a-d (only two of these being shown in FIG. 3) configured for connection to the respective four lifting parts 303a-d of the structural frame 303 of the nacelle 300. In this example, the legs 603a-d are constructed from steel.

Also in this example, the mass damper module 600 further comprises lifting parts 605a, 605b for supporting the weight of the mass damper module 600 during installation to the nacelle 300, as will be described later herein. Further in this example, the mass damper module 600 comprises a platform part 607 configured to support personnel. In this example, the active tuned mass damper 601 is supported underneath the platform part 607 by a support part 609 of the mass damper module 600.

The active tuned mass damper 601 comprises a mass (or pendulum) 601a mounted in a support structure so as to be movable relative to the (structural frame 303 of the) nacelle 300. Thus, such mass of a tuned mass damper may be referred to as a movable mass. In this example, the mass 601a is configured to be so movable in a first direction X and in a second direction Y which is perpendicular to the first direction X. That is, the mass 601a is configured for translational movement in the X-Y (horizontal) plane relative to the nacelle 300. The translational movement may occur in the first direction X only, or in the second direction Y only, or in the first direction X and the second direction Y simultaneously. Preferably the mass 601a is in the range of about 3 to 15 tonnes., such as about 10 tonnes (10,000 kg).

The active tuned mass damper 601 further comprises a processor or control unit (not shown) in communication with a plurality of actuators (not shown) for controlling the movement of the mass 601a as described. In this example, the control unit is located within the structure of the active tuned mass damper 601. Also in this example, the active tuned mass damper 601 comprises a communication interface (not shown) in communication with the control unit, for example a radio receiver, for receiving a control signal from an external source, for example a radio transmitter. Further in this example, the active tuned mass damper 601 comprises an electrical interface (not shown), for example an electrical socket, for receiving electrical power from an external source, for example a cable comprising an electrical plug.

Figure 4:
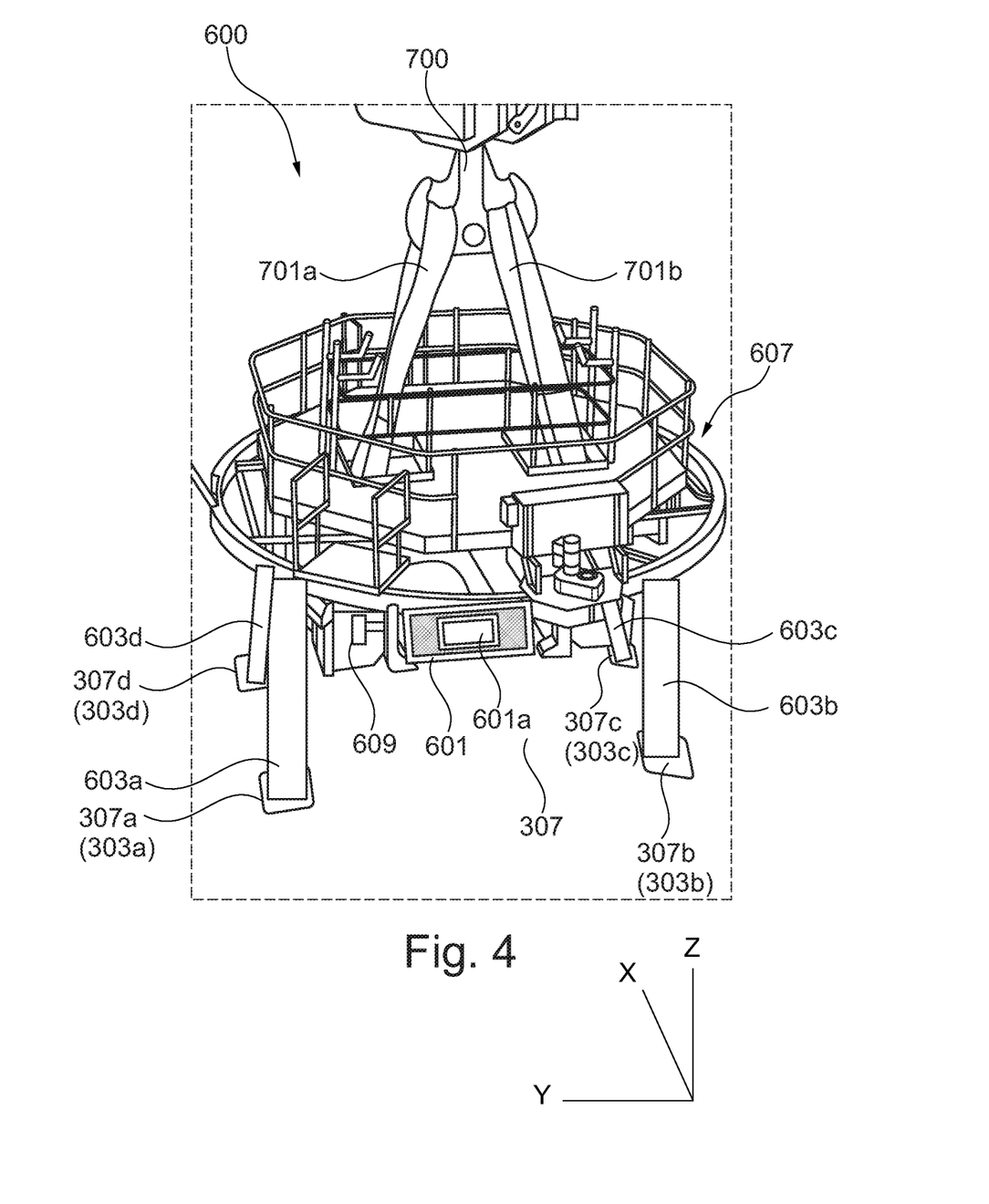
FIG. 4 shows the mass damper module mounted on the nacelle.

Attachment of the mass damper module 600 to the nacelle 300 will now be described with reference also to FIG. 4.

Each one of a pair of slings 701a, 701b is attached between a crane hook 700 and a respective one of the lifting parts 605a, 605b of the mass damper module 600. The mass damper module 600 is then lifted by the crane over the upper surface 307 of the nacelle 300 such that the connector legs 603a-d overlie the lifting parts 303a-d of the structural frame 303 of the nacelle 300. The mass damper module 600 is then lowered toward the nacelle 300 in order to bring the connector legs 603a-d into contact with the lifting parts 303a-d. Each one of the connector legs 603a-d is then attached (or connected, or coupled) to a respective one of the lifting parts 303a-d such that the mass damper module 600 is firmly fixed to the structural frame 303 of the nacelle 300 so as to be mounted on the top of the nacelle 300.

In this example, the attachment between each one of the connector legs 603a-d and its respective lifting part 303a-d is a rigid attachment whereby the mass damper module 600 is in complete fixed relationship with the structural frame 300 of the nacelle 300. That is, the attachment is such that the mass damper module 600 and the nacelle 300 cannot be moved relative to each other in any direction. Furthermore, the attachment is removable such that the mass damper module 600 may be released from the structural frame 300 of the nacelle 300, as will be described later herein.

Before, during, or after the above-described attachment of the mass damper module 600 to the nacelle 300, the tower 200 of the wind turbine 100 is hoisted into the vertical position by a crane and the lower end of the tower 200 is firmly fixed in a foundation in the seabed. The tower 200 is then ready to receive the nacelle 300.

The combined mass damper module 600 and nacelle 300 are lifted by a crane to the upper part of the tower 200, i.e. using the slings 701a, 701b attached between the crane hook 700 and the lifting parts 605a, 605b of the mass damper module 600. The nacelle 300 is manoeuvred by the crane so that the flange part 305 of the nacelle 300 overlies the complementary flange part of the upper end of the tower 200. The nacelle 300 is lowered to bring the nacelle flange part 305 into contact with the complementary flange part of the upper end of the tower 200. The nacelle 300 is rotated so that boltholes of the flange parts are brought into axial alignment. Bolts are passed through the aligned boltholes and are fastened in order to secure the two flanges together.

Thus the nacelle 300 is rigidly secured to the tower 200 such that the nacelle 300 and the tower 200 are in fixed relationship with each other and together form a partly completed wind turbine installation. Furthermore the mass damper module 600 remains attached to the nacelle 300 and in fixed relationship with the nacelle 300. Accordingly the mass damper module 600 is also in fixed relationship with the tower 200.

Following the connection of the nacelle 300 to the tower 200, the slings 701a, 701b are released from the lifting parts 605a, 605b of the mass damper module 600 and the crane is withdrawn therefrom. Thus the partly completed wind turbine installation comprises a freestanding structure comprising the tower 200 and the nacelle 300 that is subject to wind and—mostly indirectly—also to wave forces. As has been discussed herein above, these forces may cause lateral oscillations of the tower 200 and nacelle 300 i.e. due to bending of the tower structure, which may lead the partly completed wind turbine installation to sway side-to-side such as to impede the installation of the rotor blades 500a-c to the rotor hub 400. This problem of oscillation may be mitigated by use of the active tuned mass damper 601, which forms part of the mass damper module 600 that is itself rigidly coupled to the nacelle 300.

In use, the mass 601a of the active tuned mass damper 601 is controlled to be moved, relative to the nacelle 300 and the tower 200, so as to counteract (or balance) the lateral vibrations of the tower 200 and nacelle 300 that are caused by the wind and wave forces. The movement of the mass 601a is in the X-Y (horizontal) plane, i.e. perpendicular to the longitudinal (or vertical) axis of the tower 200, and may be in the X direction only, the Y direction only, or the X direction and the Y direction in combination, as appropriate according to the motion of the structure.

Figure 5:
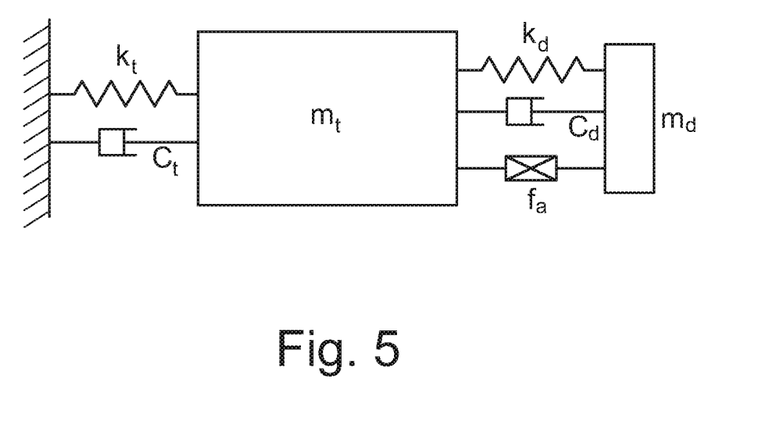
FIG. 5 is a schematic representation of a dynamic system comprising the wind turbine and the mass damper module.

The dynamic system is represented schematically in FIG. 5, wherein: subscript t denotes main mass (combined tower 200 and nacelle 300); subscript d denotes damper; and subscript a denotes active force. In this system, passive damping and stiffness of the tuned mass damper is combined with active force, i.e. using the controller and actuators. The active force is added using the control unit according to a control algorithm. One specific mode shape/structural frequency may be targeted. Compared with a passive tuned mass damper, the active force provided by the active tuned mass damper 601 enables a similar reduction in structural response but using a smaller damper mass.

The vibration of the partly completed wind turbine installation is thus controlled or damped so that the structure is stabilised, thereby enabling the rotor blades 500a-c to be more easily lifted into position by a crane and attached to the rotor hub 400.

The attachment of the rotor blades 500a-c completes the installation and improves the dynamic stability of the wind turbine 100. The mass damper module 600 may therefore be safely removed from the nacelle 300 at this stage. Accordingly the slings 701a, 701b are re-attached between the crane hook 700 and the lifting parts 605a, 605b of the mass damper module 600, and the connector legs 603a-d are detached (or disconnected, or uncoupled) from the lifting parts 303a-d of the structural frame 303 of the nacelle 300. The mass damper module 600 is then lifted away from the nacelle 300 and returned to the ground by the crane. The mass damper module 600 may then be used in the same manner for the installation of another wind turbine.

It should be understood that the invention has been described in relation to its preferred embodiments and may be modified in many different ways without departing from the scope of the invention as defined by the accompanying claims.

In the above-described example, attachment legs of the mass damper module are attached to attachment parts or portions of a tubular structural frame of the nacelle. While this is one possible means of attachment, it will be understood that the attachment of the mass damper module to the nacelle may take a variety of different forms. For example, the attachment points of the nacelle may be distinct structural members rather than portions of a continuous structural frame. Furthermore the mass damper module may comprise a structural frame having attachment parts, rather than a plurality of distinct attachment legs. All of these different means of attachment are within the scope of the claimed invention, provided that they afford a connection, between the mass damper module and nacelle, which enables the lateral/horizontal oscillations of the nacelle to be counteracted by the active tuned mass damper of the mass damper module.

Furthermore, while in the above-described example the mass damper module is attached to the nacelle such that the mass damper module and the nacelle cannot be moved relative to each other in any direction, in another example some degree of freedom of movement may be provided. For example, the mass damper module may be attached to the nacelle such as to prohibit relative lateral/horizontal movement i.e. in the X direction and the Y direction or some combination thereof but to allow relative axial/vertical movement i.e. in the Z direction. In another example, some degree of relative lateral/horizontal movement may be allowed by the attachment between the mass damper module and the nacelle, with or without freedom of movement in the Z direction. All such attachment arrangements are within the scope of the claimed invention, provided that they enable the lateral/horizontal oscillations of the nacelle to be counteracted or damped by the active tuned mass damper of the mass damper module.

While in the above-described example the active tuned mass damper is located at a lower part of the mass damper module, it will be understood that any location of the active tuned mass damper will be suitable, provided that the location allows for the lateral/horizontal oscillations of the nacelle to be counteracted or damped by the active tuned mass damper.

While in the above-described example the control unit is located within the structure of the active tuned mass damper, the control unit may alternatively be located elsewhere within the structure of the mass damper module. In another example, the control unit is located remotely from the mass damper module, for example at a ground station. In this case, control signals may be sent from the control unit to the communication interface of the mass damper module in order to activate the actuators to move the mass or pendulum.

While in the above-described example the mass damper module comprises an electrical interface for connection to an external electrical power source for powering the active tuned mass damper, in another example electrical power is alternatively or additionally provided by an energy storage device of the mass damper module, for example a battery.

While in the above-described example the mass damper module is attached to the nacelle prior to the attachment of the nacelle to the tower, in an alternative sequence of installation the nacelle is first attached to the tower and the mass damper module is then attached to the nacelle.

While in the above-described example the mass damper module is removed from the nacelle following the installation of the rotor blades to the rotor hub, if desired the mass damper module may alternatively be left attached to the nacelle in order to provide damping to the completed structure during the service life of the wind turbine. In this case, the mass damper module may be lifted into place for attachment to the nacelle before or after the nacelle is attached to the tower using a lifting tool. For this purpose the lifting tool may include lower lifting parts, for supporting the weight of the mass damper module underneath the lifting tool, and upper lifting parts, for attaching the lifting tool to the hook of a crane, such that in use the lifting tool is positioned between the crane hook and the mass damper module. Thus, if it is desired for the mass damper module to remain attached to the nacelle after rotor blade installation, or if otherwise desired, the lifting tool may be removed from the mass damper module while the mass damper module remains attached to the nacelle. Use of a lifting tool in this way may advantageously reduce the overall size and weight of the mass damper module. Furthermore, it may also be desired that the lifting tool is removed from the mass damper module after installation of the mass damper module, but prior to use of the mass damper module during installation of the blades, and then e.g. reattached to the mass damper module prior to any removal of the mass damper module. This is an option which may likely be used, e.g. when the mass damper module is lifted into place for attachment to the nacelle after the nacelle is attached to the tower. In such or other cases, the lifting tool may or may not be configured differently than embodied herein, such as to be more simple, such as not to include a platform and/or not be able to rotate what it lifts.

The invention claimed is:

1. A nacelle assembly configured to be attached to a tower of a wind turbine to define a wind turbine installation, the nacelle assembly comprising:
   a nacelle including a structural frame that includes a plurality of lifting points, the nacelle being configured to be lifted by a crane with the plurality of lifting points; and
   a mass damper module removably attached to the plurality of lifting points of the nacelle for lifting the nacelle, the mass damper module being in a fixed relationship with the structural frame of the nacelle to support the entire weight of the nacelle when lifted by the crane, the mass damper module including a module frame and an active tuned mass damper supported by the module frame, the active tuned mass damper being controllable to damp vibration of the wind turbine installation;
   wherein the module frame of the mass damper module is configured to be rigidly attached to the nacelle so as to be self-supporting such that relative movement between the module frame and the nacelle is prohibited in any direction.

2. The nacelle assembly of claim 1, wherein attachment of the mass damper module to the plurality of lifting points of the nacelle is for mounting the mass damper module on an external surface of the nacelle.

3. The nacelle assembly of claim 2, wherein the external surface is on a top of the nacelle.

4. The nacelle assembly of claim 1, wherein the plurality of lifting points are located within a housing of the nacelle.

5. The nacelle assembly of claim 4, wherein the housing of the nacelle includes a plurality of apertures that provide access to the plurality of lifting points.

6. The nacelle assembly of claim 1, wherein the mass damper module includes a plurality of legs, each of the plurality of legs being configured to be removably attached to a corresponding one of the plurality of lifting points of the nacelle.

7. The nacelle assembly of claim 1, wherein the mass damper module includes at least one structural lifting part for lifting the mass damper module or the nacelle assembly.

8. The nacelle assembly of claim 1, wherein the active tuned mass damper of the mass damper module includes a mass that is controllable to be moved in a plane substantially perpendicular to a longitudinal axis (Z) of the tower in order to damp vibration of the wind turbine installation.

9. The nacelle assembly of claim 8, wherein the mass is selectively controllable to be moved in the plane in a first direction (X) and a second direction (Y) substantially perpendicular to the first direction (X).

10. The nacelle assembly of claim 9, wherein the mass is controllable to be moved in the plane so as to have a component of movement in the first direction (X) and a component of movement in the second direction (Y).

11. The nacelle assembly of claim 1, wherein the mass damper module includes a controller configured to control movement of the active tuned mass damper.

12. The nacelle assembly of claim 1, wherein the mass damper module includes an electrical interface for connection to an external electrical power source for powering the active tuned mass damper.

13. The nacelle assembly of claim 1, wherein the mass damper module includes an energy storage device for powering the active tuned mass damper.

14. A wind turbine comprising a tower and the nacelle assembly of claim 1.

15. A method of assembling a wind turbine, the method comprising:
   providing:
      a nacelle including a structural frame that includes a plurality of lifting points, the nacelle being configured to be lifted by a crane with the plurality of lifting points; and
      a mass damper module removably attachable to the plurality of lifting points of the nacelle for lifting the nacelle, the mass damper module being in a fixed relationship with the structural frame of the nacelle to support the entire weight of the nacelle when lifted by the crane, the mass damper module including a module frame and an active tuned mass damper supported by the module frame, the active tuned mass damper being controllable to damp vibration of the wind turbine installation;
   attaching:
      the mass damper module to the nacelle wherein the module frame of the mass damper module is rigidly attached to the nacelle so as to be self-supporting such that relative movement between the module frame and the nacelle is prohibited in any direction and attaching the nacelle to a tower to form a wind turbine installation, or
      the nacelle to a tower to form a wind turbine installation and attaching the mass damper module to the nacelle wherein the module frame of the mass damper module is rigidly attached to the nacelle so as to be self-supporting such that relative movement between the module frame and the nacelle is prohibited in any direction;

controlling the active tuned mass damper to damp vibration of the wind turbine installation; and attaching one or more rotor blades to the wind turbine installation.

16. The method of claim 15, further comprising removing the mass damper module from the nacelle after attaching the one or more rotor blades to the wind turbine installation.

* * * * *